L. W. YAGGY & J. N. LOOP.
STALK, STUBBLE AND WEED TURNER.
No. 185,417.            Patented Dec. 19, 1876.
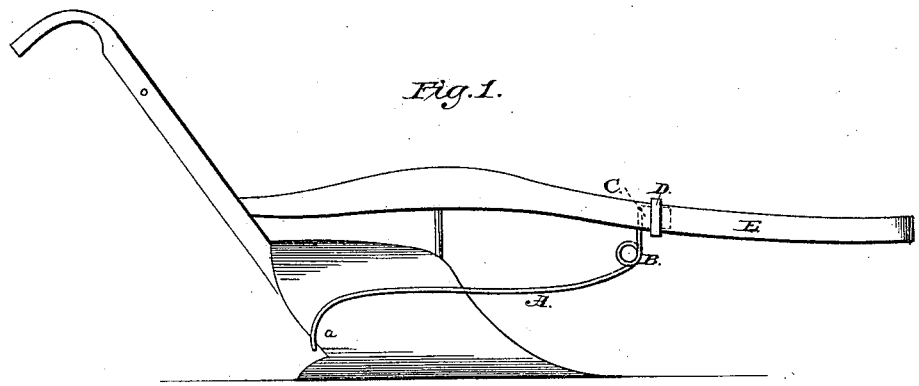
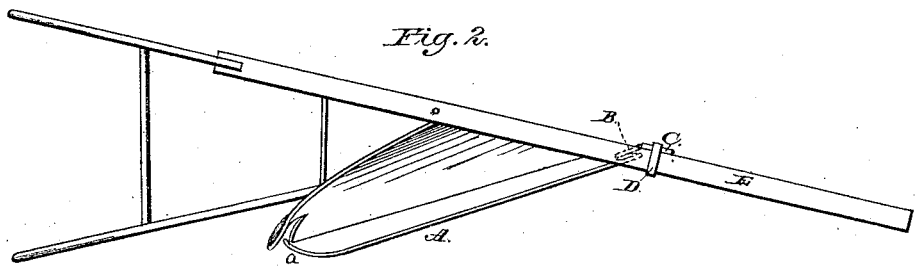
Attest:
A. Moore
H. Clay Smith
Inventor:
Levi W. Yaggy
John Nicholas Loop
THE GRAPHIC CO. N.Y.

UNITED STATES PATENT OFFICE.

LEVI W. YAGGY, OF CHICAGO, ILLINOIS, AND JOHN N. LOOP, OF KOKOMO, INDIANA.

IMPROVEMENT IN STALK, STUBBLE, AND WEED TURNERS.

Specification forming part of Letters Patent No. 185,417, dated December 19, 1876; application filed September 7, 1876.

*To all whom it may concern:*

Be it known that we, L. W. YAGGY, of the city of Chicago, Illinois, and J. N. LOOP, of the city of Kokomo, in the county of Howard and State of Indiana, have invented a new and useful Improvement in a Stalk, Stubble, and Weed Turner, a device which is attached to a plow, and is fully set forth in the following specification, reference being had to the accompanying drawings.

The object of our invention is an attachment to the plow to turn under stalks, stubble, and weeds, and to hold them down while the ground falls on them and buries them.

The spring-rod A, with the spiral B in it, is cast in a suitable casting, which is clasped to the beam E, with an ordinary plow or colter clevis, D, as shown in Figure 1 of the accompanying drawing. The bar A is fastened to the same side of the beam as the colter, so as to catch every thing that the plow turns up. The spiral B gives the rod the proper spring, which is necessary to prevent it from bending or breaking. The rod from $a$ to B is bent on a direction nearly parallel with the mold-board, and at the point $a$ is bent to nearly a hook downward, and also toward the mold-board, as is seen in Fig. 2.

The portion of the rod from B to $a$ is a guard, and as it comes to the stalks it presses them forward and downward, while the hook $a$ draws them in the furrow just as the ground falls upon them. The block C, in which the rod is cast, is made a little smaller than the ordinary colter-clevis, which gives it a little play, and by that means it affords any adjustment. It can be set backward or forward, higher or lower, and by the use of a small wedge it can be set nearer to or farther from the mold-board, which adjustment must necessarily be varied according to the stalks, stubbles, and weeds, or for deep or shallow plowing. By attaching the rod in this way it will fit to any plow.

We claim as our invention—

As a weed-turning attachment to plows, the curved spring-rod A, having the hook end $a$, and extending rearward nearly on a line with the edge of the plowshare, in combination with the block C, clamp D, and plow-beam, substantially as shown and described.

LEVI W. YAGGY.
JOHN NICHOLAS LOOP.

Witnesses:
THOMAS C. CONNOLLY,
WARREN I. COLLAMER.